July 26, 1932.　　　　O. M. GLAHN　　　　1,868,894
CONVEYER
Filed May 3, 1929　　　3 Sheets-Sheet 1

Inventor:
Otto M. Glahn
by Roberts Cushman & Woodberry
Attys.

July 26, 1932.  O. M. GLAHN  1,868,894
CONVEYER
Filed May 3, 1929  3 Sheets-Sheet 2

Inventor:
Otto M. Glahn
Attys.

July 26, 1932.  O. M. GLAHN  1,868,894
CONVEYER
Filed May 3, 1929   3 Sheets-Sheet 3
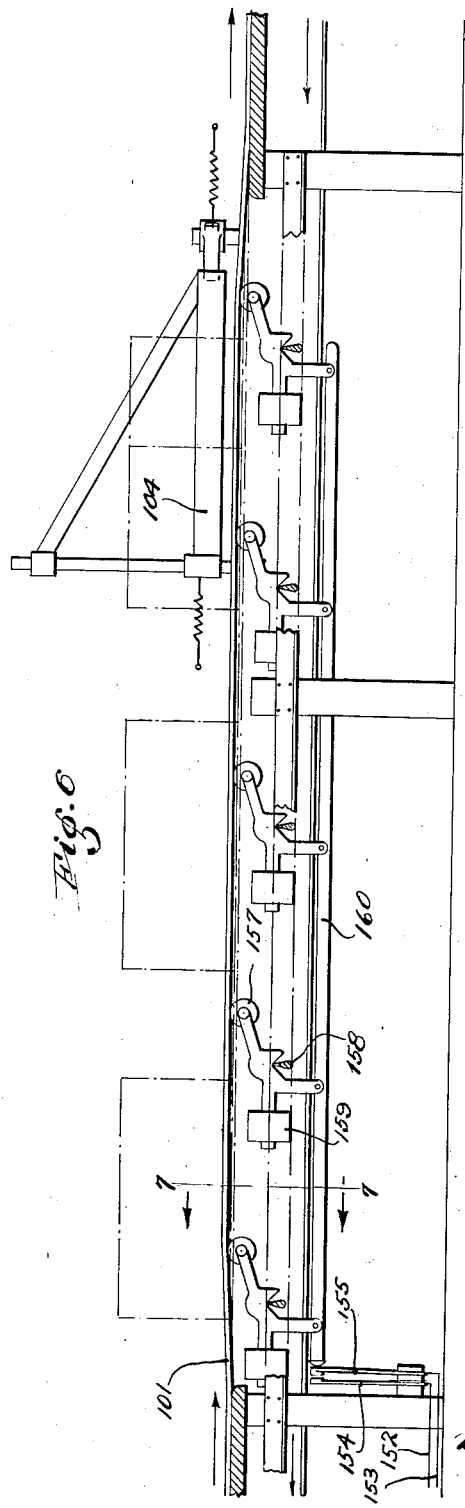
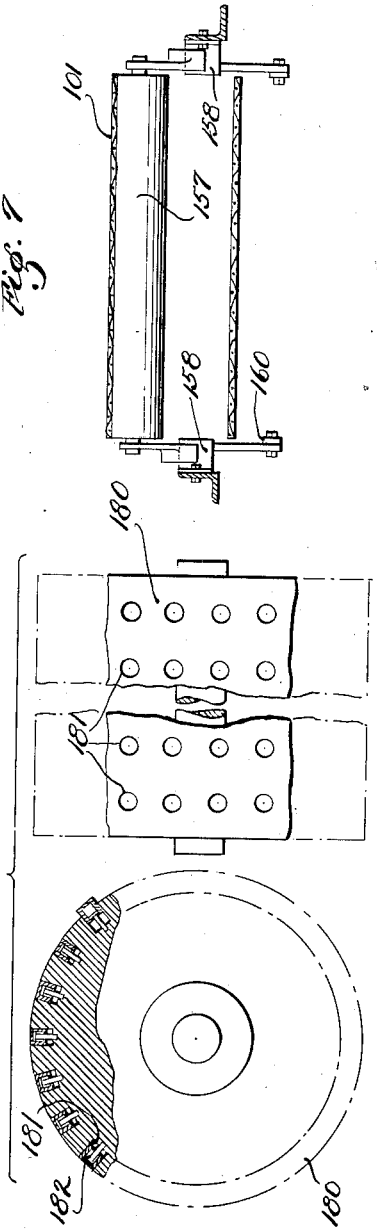
Inventor:
Otto M. Glahn
by Roberts, Cushman & Woodbury
Att'ys.

Patented July 26, 1932

1,868,894

UNITED STATES PATENT OFFICE

OTTO M. GLAHN, OF SYRACUSE, NEW YORK, ASSIGNOR TO THE LAMSON COMPANY, OF SYRACUSE, NEW YORK, A CORPORATION OF MASSACHUSETTS

CONVEYER

Application filed May 3, 1929. Serial No. 360,184.

This invention pertains to a conveyer system and more particularly to apparatus for selectively determining the diversion of articles or groups of articles from a main or trunk conveyer track to stations or branch tracks occurring at spaced intervals along the main track. In accordance with modern methods of selective conveyer distribution, the material to be distributed (for example individual packages, boxes, or the like, or carriers or cars in which the articles, materials, etc. may be placed) is delivered to the conveyer at a receiving station and despatched to the proper destination by an operator or despatcher stationed at a keyboard or other appropriate apparatus adapted to control the operation of unloading devices, for example, switches or equivalent means, adjacent to the respective branch tracks or stations. Since articles may be delivered uninterruptedly to the conveyer, and as articles, either singly or in series or trains, may be destined for any given station or branch track of the system, it has been proposed to provide mechanism intermediate the keyboard and the unloading devices such that, although the despatcher performs the appropriate operation, (for example presses the proper key of the keyboard) as the article passes him at the despatching station, the corresponding actuation of the unloading device does not take place until just before the arrival of the particular article (or series of articles) at the station or branch track which it is to enter. Thus the setting of the switch, or the initiaion of the operation of such other form of unloading device as may be employed, does not conflict with a different setting of the switch means or a different operation of the unloading device appropriate to care for a preceding or following article (or train of articles). In prior arrangements known to me the switch deflector or unloading device remains in deflecting position or in operation (after once being set or started) until released by a further operation of the timing means. This mode of operation adds to the complexity of the timing mechanism and requires the despatcher to perform two separate operations, first to set the switch or unloading device into operation or operative position, and second to stop or restore it to normal position. Since, ordinarily the number of articles moving along the main conveyer track is much greater than the number deflected or unloaded at any given station, I find it preferable to have the switch or unloading means restored to its normal or inoperative position immediately after its deflecting or unloading function (as respects any given article or train of articles) has been completed, and by imposing upon the articles themselves the duty of determining the restoration of the switch or unloading means to its normal condition I am able to employ a simple form of timing mechanism and to a certain extent at least to diminish the work of the despatcher.

In the accompanying drawings I have illustrated certain desirable embodiments of the invention by way of example in the drawings Fig. 1 is a fragmentary diagrammatic plan view, with certain details shown in elevation, illustrating one desirable embodiment of the invention applied to a conveyer system of belt type, two branches, sidings, or stations, being illustrated;

Fig. 6 is a diagrammatic side elevation of parts shown in Fig. 5;

Fig. 7 is a section substantially on the line 7—7 of Fig. 6;

Fig. 8 is a fragmentary plan view, partly broken away, showing a desirable form of gate retaining latch; and Fig. 9 is a composite diagrammatic view showing in end elevation and in side elevation respectively a modified form of timing controller.

While the present invention is applicable to conveyers of any usual type whether the article to be conveyed is moved by gravity, by fluid pressure, or suction; by mechanical means such as belts, cables or chains; or by electromagnetic means, etc. I have chosen herein to illustrate it as applied to a conveyer of belt type in which the article to be conveyed is moved along a main or trunk line track or way by means of an endless belt whose article supporting run is substantially horizontal, and having at intervals sidings, stations, or branch tracks. Such branch tracks or stations may comprise other article moving means of any desired type and in the broader aspect of the invention may lead either to or from the main conveyer but as shown consist merely of sidings or rest stations provided with anti-friction rollers onto which the article is delivered from the main conveyer and where it eventually comes to rest.

While I have chosen for convenience and simplicity to illustrate pivoted switch arms or deflectors as the means for discharging articles from the main conveyer into the branch track or station I contemplate that in its broader aspects the invention is applicable to any kind of article discharge means inclusive, not only of switches or deflectors, but also for example of electromagnetic or pneumatic devices, elevators, lowerators, chutes, etc. such as are commonly employed in the conveyer art and all of which I include under the general designation of unloading devices.

Figure 1:
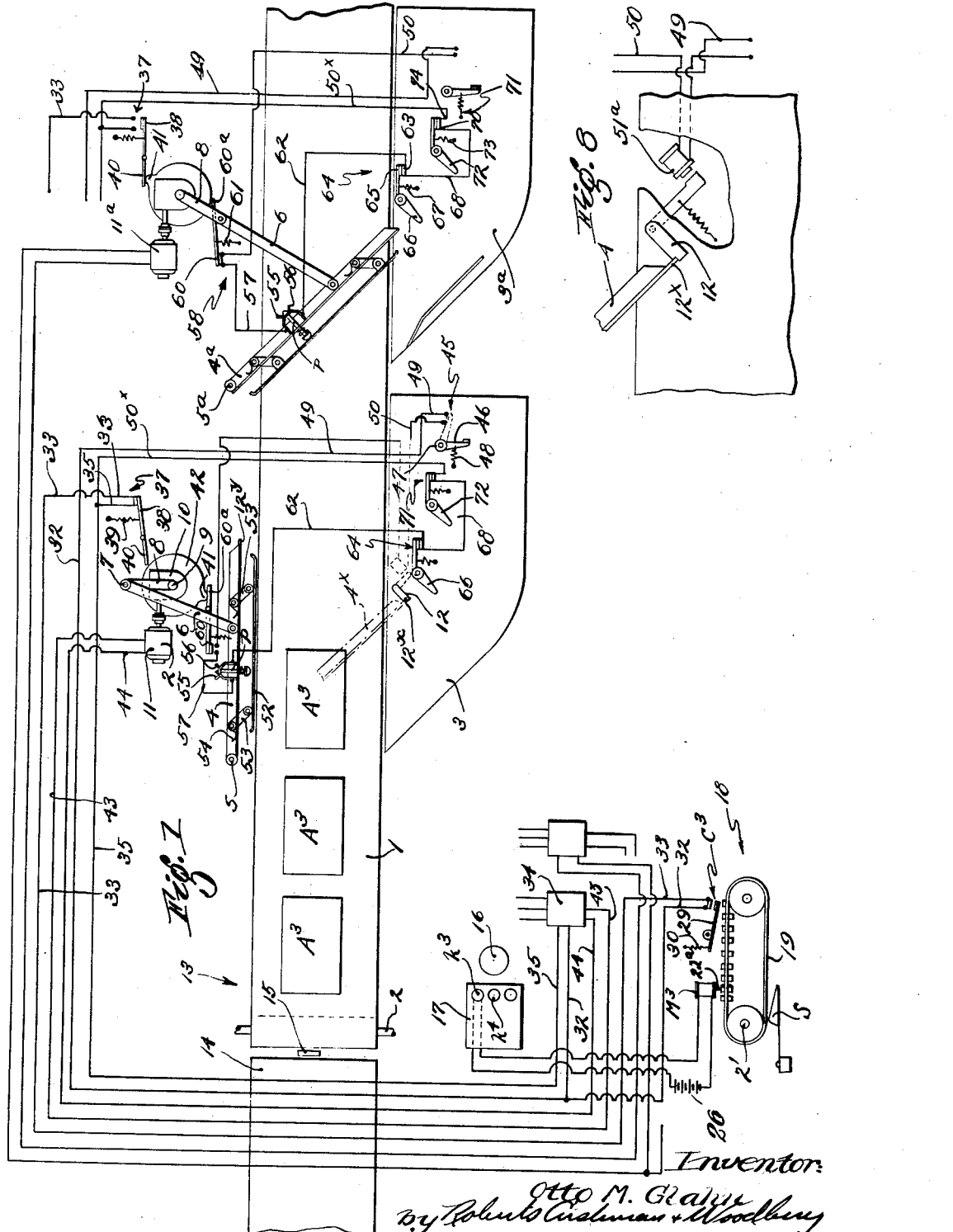

Referring to Fig. 1, the conveyer here chosen for illustration comprises an endless belt 1 having its active or article-supporting run substantially horizontal. Preferably the article-supporting run of this belt rests upon a series of anti-friction rollers or equivalent supporting means not shown and is driven by a drum mounted upon a drive shaft 2 which may receive its motion from a suitable motor, or through belt connections from any other desired source of power. As here shown the conveyer comprises a plurality of stations into which articles may be diverted from the main conveyer line. I have here shown two such stations, 3 and 3$^a$, it being understood that the number of stations may be varied at will, since the underlying principle of the present invention is capable of application to a substantially unlimited number of stations. While as above noted other types of unloading means may be employed for removing articles from the main conveyer track at the stations, I have here shown pivoted deflector or switch arms 4 and 4$^a$ respectively at the stations 3 and 3$^a$, such deflecter or switch arms being pivoted at the points 5 and 5$^a$ and when in normal or inoperative position being disposed (as indicated in full lines at station 3) substantially parallel to the edge of the belt 1 and out of the path of articles moving along with the belt. As illustrated in Fig. 1 each deflector or switch arm is provided with means for moving it into and out of operative position, such means comprising a link 6 pivotally secured at one end to the switch arm and at its other end to a crank pin 7 on a crank arm 8 fixed to a shaft 9. This shaft 9 is driven (through suitable speed reduction gearing not shown in detail but enclosed in a housing 10) by means of a motor 11 here shown as an electric motor.

The end 13 of the belt 1 may be considered as the receiving end to which the articles may be delivered manually or by means of another conveyer, chute, or the like, indicated at 14. If the articles be delivered by means of a chute or feeder conveyer, it is preferable to provide a stop at the point 15 to permit articles to be delivered onto the conveyer only in orderly spaced sequence.

The numeral 16 designates the station of an operator or despatcher, located adjacent to the receiving end of the conveyer in convenient position to permit the despatcher to view the articles moving along upon the conveyer and by inspection to determine their destinations. At this operator's station there is arranged suitable means, for example, a keyboard 17 having keys $K^3$, $K^4$, etc., corresponding to the several stations, by means of which the despatcher, through mechanism now to be described, sets the appropriate switches or deflectors to divert the articles into their proper stations.

Since a considerable period of time may elapse after the articles pass the despatcher station before they reach the proper switch which is to divert them, and as other articles destined for other stations may have preceded them, it is desirable to provide a delayed action timing controller between the despatcher's keyboard and the mechanism which actuates the switches, so that the switches will not be set prematurely and thereby cause improper diversion of the articles. Such a delayed action controller is indicated generally by the numeral 18 (Fig. 1) and is illustrated more in detail in Figs. 2 and 3.

Broadly stated this controller as here illustrated comprises an endless carrier which moves in accurately timed relation to the conveyer belt 1, and upon which index elements are set by the action of the keys on the keyboard, such index elements moving with the carrier and after a predetermined interval actuating the proper switch by means of appropriate intermediate mechanism.

Figure 2:
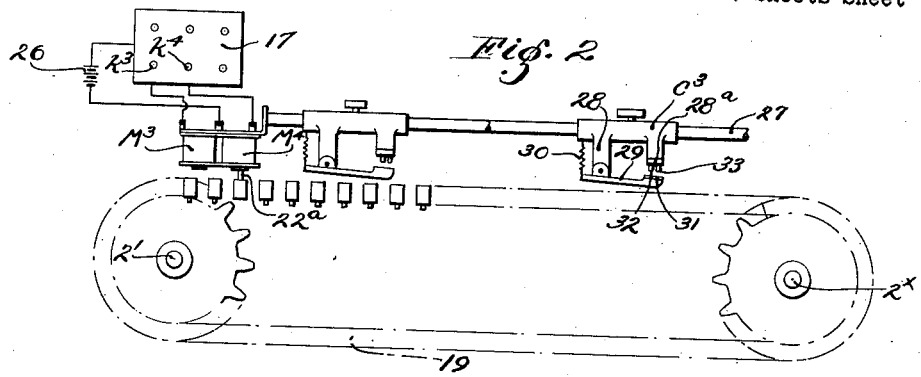
Fig. 2 is a fragmentary side elevation, with certain parts in diagrammatic plan view and certain parts in section, illustrating one desirable form of timing controller.
Figure 3:
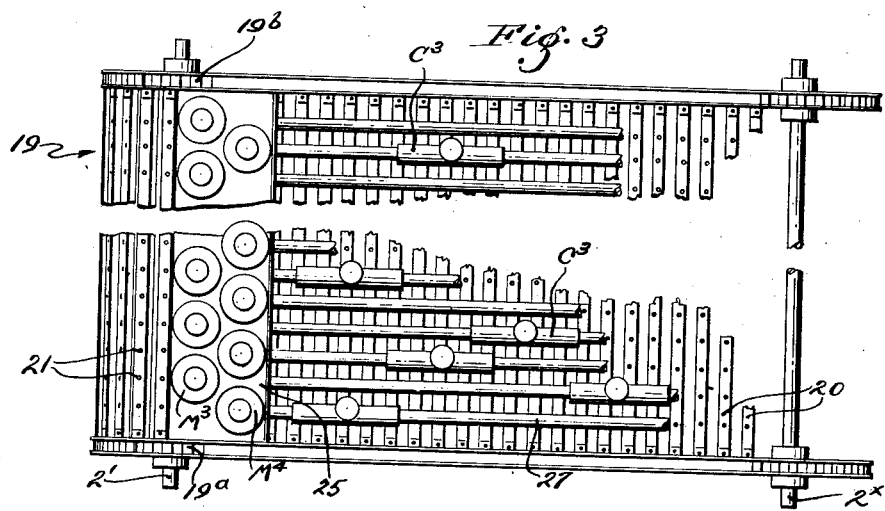
Fig. 3 is a plan view, partly broken away, of the parts illustrated in Fig. 2.

As here illustrated in Figs. 1, 2 and 3, the endless carrier is in the form of a belt 19 comprising spaced parallel sprocket chains 19ᵃ and 19ᵇ traveling over sprocket wheels on shafts 2′ and 2ˣ respectively. The shaft 2′ is connected preferably through appropriate reduction gearing (not shown) to the shaft 2 which drives the main conveyer belt, the ratio of speed being so chosen that while an article is moving from the despatcher's station to a given switching station, an index element on the carrier is moving from the setting position to the switch actuating position.

The carrier belt also comprises a series of transverse bars 20 connecting the chains 19ᵃ and 19ᵇ. Each of these bars carries a plurality of index elements, the index elements of adjacent bars being arranged in alignment so as to form series extending longitudinally of the carrier, the several series being spaced transversely of the carrier. Each series of index elements corresponds to one of the switching stations.

Figure 4:
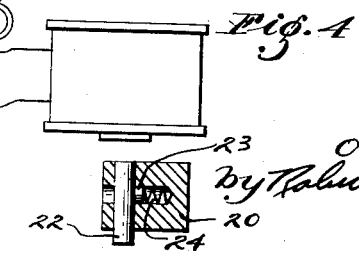
Fig. 4 is a vertical section to larger scale, partly in elevation, illustrating certain details of the timing controller.

As shown more particularly in Fig. 4 the index elements consist of pins 22 adapted to slide in sockets in the bars 20, the bars being provided with retaining means, for example, friction plungers 23 pressed by springs 24 against the respective pins and adapted to hold the pins either in retracted position as shown in Fig. 4, where the upper end of the pin is substantially flush with the upper surface of its supporting bar, or in an operative projected position as shown at 22ᵃ (Figs. 1 and 2) where the end of the pin extends above the surface of the bar.

For moving the index pins into operative position, I preferably provide a support 25 extending across the carrier belt at a convenient point, and on this support I mount a plurality of magnets $m^3$, $m^4$, etc., each magnet being adapted to control the index pins of one series and thus corresponding to one of the switch stations. Each magnet, $m^3$, $m^4$, etc., is connected by appropriate conductors to the corresponding keys $k^3$, $k^4$, etc., of the keyboard, the magnetic circuits being supplied with current from any suitable source, for example, a battery 26, it being understood that the keys $k^3$, $k^4$, etc., act as circuit closers. Whenever one of these keys is depressed, the corresponding magnet is energized and as the carrier bars move along beneath the energized magnet the index pins 22 of the corresponding series are moved upwardly by the magnet to operative position, successive pins being raised so long as the magnet remains energized. Ordinarily the key is held depressed only long enough for the lifting of a single pin.

I preferably provide a plurality of elongate supports, for example, bars 27 extending lengthwise above the carrier belt, each bar corresponding to one of the series of index elements, and on each bar I mount a circuit closer $C^3$ which is adjusted to the proper position longitudinally of the bar, in accordance with the distance of the station which it serves from the despatcher's station. As shown, this circuit closer comprises a sleeve adjustably mounted upon the sliding bar and having a bracket 28 forming a support for a pivoted lever arm 29. This lever arm is normally held in circuit breaking position by the spring 30 and at its free end carries a circuit closing plate 31 adapted to connect a pair of insulated terminals mounted on a bracket arm 28ᵃ when the lever arm 29 is moved upwardly. The terminals carried by the bracket 28ᵃ are connected to conductors 32 and 33 respectively, (Fig. 1)—the conductor 32 leading to an electromagnetic switch actuator in a control box 34. From this control box, a second conductor 35 extends to a point adjacent to the station 3, where it is connected to one terminal of a normally closed circuit breaker 37. This circuit breaker comprises a lever 38 carrying a contact element for completing the circuit through the terminals of the circuit breaker and normally held in the position shown in Fig. 1 by means of a spring 39. This lever 38 has a tail portion 40 engageable by an elevation 41 on a cam member 42 mounted on a shaft 9, the elevation 41, when it engages the tail 40, swinging the lever and thus breaking the circuit through the terminals of the circuit breaker 37. The conductor 33 extends from the other terminal of this circuit breaker 37 down to the circuit closer $C^3$ as above described.

From the control box 34 (Fig. 1) conductors 43 and 44 lead to the motor 11, which turns the shaft 9 at the station 3. The specific construction of the controller 34 need not be described, since magnetic controllers of this type are well-known, it being sufficient to state that current is received from the power line and is delivered to the motor 11 through the conductors 43 and 44 only when the electromagnet actuating element of the controller is energized by current through the circuit comprising the conductors 32, 33 and 35.

At the station 3, I provide a circuit closer 45 which may, for example, comprise a lever arm 46 pivoted at 47 and normally held in the position indicated in Fig. 1 by a spring 48. This lever arm is so disposed with respect to the path and articles diverted into the station 3 that as an article passes through the station 3, (being supported, for example, upon anti-friction rollers,—sliding by gravity down a chute,—or resting upon a secondary conveyer belt) such article will engage the arm 46 and swing it to the dotted line position shown in Fig. 1. The arm 46 carries a contact plate which, when the arm is in dotted position, closes a circuit between terminals from which extend conductors 49 and 50 respectively. The conductor 49 is connected, as shown in Fig. 1, to the conductor 32, above described, while the conductor 50, through intermediate connections about to be described, leads to conductor 50$^x$, which is connected to the conductor 35 above described. Normally the circuit through the conductors 49 and 50 is open at the point 45, but were it not for the intermediate connections hereafter described, the closing of the circuit at 45 would complete a circuit through the conductors 33 and 35 and thus energize the motor 11 in the same way as the depression of the key $k^3$. Under certain conditions such an arrangement may be desirable, that is to say, one in which the conductor 50 is connected directly to the conductor 50$^x$. However, I prefer to employ the following additional features in order to simplify the operation when a series of closely spaced articles is to be despatched to the same station.

Thus, I prefer to provide each deflector or switch arm 4 with a feeler member 52, here shown as consisting of a plate of light weight mounted upon parallel link members 53 carried by the deflector proper. This feeler member 52 is normally held outwardly away from the gate by means of springs 54, but is readily moved backwardly toward the gate by pressure of an article against it. The gate 4 carries a pair of spaced terminals 55 and 56 which are normally connected by means of a conducting plug carried by a pin P which is normally held in forward position by means of a suitable spring. The head of this pin P lies immediately behind the feeler plate 52 and when the latter is pushed back by pressure of an article against it, the pin is thrust rearwardly from between the terminals 55 and 56, thus breaking the electrical connection between the terminals.

The terminal 55 is connected by a conductor 57 to one terminal of a circuit breaker at 58. The terminals of this circuit breaker are normally electrically connected by a suitable conducting element mounted on a lever 60 and held in circuit closing position by a spring 61. This lever is provided with a tail 60$^a$ lying in the path of the elevation 41 of the cam 42, and when engaged by this elevation the lever is so actuated as to break the circuit at the point 58. The other terminal of the circuit breaker 58 is connected directly to the conductor 50 above described.

A conductor 62 connects one terminal of circuit breaker 58 through terminals 55, 56 with one terminal 63 of another circuit breaker 64 comprising a contact element 65 carried by a lever having an arm 66 disposed in the path of articles as they enter the station 3,—a spring 67 normally holding the lever in circuit closing position. The other terminal of this circuit breaker 64 is connected by a conductor 68 to one terminal 70 of another circuit breaker 71. This circuit breaker also comprises a lever having a contact element which normally closes the circuit through the terminals, and which has an arm 72 also disposed in the path of articles moving into the station. A spring 73 normally holds this circuit breaker in circuit closing position. The other terminal 74 of this circuit breaker 71 is directly connected to the conductor 50$^x$ above described.

The operation of the apparatus as thus far described is substantially as follows, it being assumed that a series of articles A$^3$ has just been delivered onto the conveyer belt 1 and is passing the station of the despatcher. The despatcher notes from the appearance, or other indications, the destination of the articles passing his station and depresses the proper key, for example, the key 3 of his keyboard. The depression of this key in the manner above described immediately energizes the magnet M$^3$ and raises a corresponding pin of the carrier belt to its operative position as shown at 22$^a$. Having performed this operation the despatcher is now free to give his attention to succeeding articles moving along the conveyer belt and as such articles pass him he depresses the proper key to determine their destination.

The carrier belt 19, moving at a given rate of speed relative to that of the conveyer belt, carries the operatively positioned pin 22$^a$ toward the circuit closer C$^3$ and just before the leading article A$^3$, destined for the station 3, reaches the switch arm 4, the elevated pin 22$^a$ strikes the lever 29, thus closing the circuit through the conductors 32 and 33. The corresponding controller 34 is actuated and sends a current through conductors 43 and 44 into the motor 11, thus turning the shaft 9, and through the crank arm 8 and link 6 swinging the switch 4 to its operative position, as indicated in broken lines at 4$^x$ at station 3, or in full lines at 4$^a$ at station 3$^a$. When the switch arm 4 reaches its operative position, the link 6 and crank 8 are in substantial alignment, thus effectively preventing movement of the switch arm out of its operative position by the impact of an article thereagainst.

As the shaft 9 begins to turn, the elevation 41 passes out of contact with the lever 60$^a$, thus closing the circuit between the conductors 50 and 57. When the shaft 9 has made substantially a half revolution, and the switch arm has reached operative position, the elevation 41 of the cam 42 engages the lever 40 and breaks the circuit through the conductors 33 and 35, whereupon the controller 34 cuts off the current from the motor 11 and the latter stops. While the above arrangement for holding the gate or deflector 4 in operative position is usually sufficient for the purpose, I may provide additional means, such for example as the spring actuated latch 12 (shown at station 3, Fig. 1, and in detail in Fig. 8) which is adapted, as the gate nears its operative position, to snap over a retaining lip 12ˣ on the gate, thus positively locking the latch in its operative position. When employing this latch arrangement, I provide a latch releasing magnet 51ᵃ in series with the conductor 50,—such magnet when energized, withdrawing the latch 12 from engagement with the lip 12ˣ so as to release the gate.

It being noted that the carrier 19 moves continuously, the pin 22ᵃ disengages the lever 29 after an interval of sufficient duration to permit the motor 11 to set the switch arm, as above described, and at some convenient time after the pin has disengaged the arm 29, the pin is restored to its normal or inoperative position by engagement with a resetting device S. This resetting device preferably takes the form of a resiliently supported cam extending transversely across the carrier belt and adapted to reset all operatively positioned pins as they pass.

As an article moves along the conveyer belt and engages the feeler 52 of an operatively positioned gate, it pushes the feeler back and as above described breaks the electrical connection between the contacts 55 and 56. The article now moves laterally from off the belt 1 into the station 3 where it continues to move, either by momentum, gravity, or the action of suitable driving means, and as it enters the station engages the arm 66, thus breaking the connection between the conductors 63 and 68. The article continues to move through the station and subsequently engages the arm 72, breaking the circuit between the terminals 70 and 74. After leaving the arm 72 it eventually engages the arm 46 of the circuit closer 45. Provided but one article is destined for the station 3 and that such article has passed the feeler 52 and the arms 66 and 72, the closing of the circuit at the point 45 completes a circuit through the conductors 33 and 35 and the controller 34, thus again causing the motor 11 to be energized, whereupon the shaft 9 is turned and the switch arm 4 is moved back to its normal inoperative position, it being noted that if the retaining latch 12 be employed, the closing of the circuit through the circuit closer 45 releases the latch 12 to permit the gate to open. As soon as the shaft 9 begins to turn, the circuit is again closed through the circuit breaker 37 and when the gate reaches its normal inoperative position the circuit is broken at the point 60 by engagement of the part 41 with the lever 60ᵃ. The parts are thus restored to normal position ready for a subsequent operation.

However, if instead of a single article to be delivered to the station 3, a series of such articles spaced a short distance one from the other, are to be delivered to the station, it will be noted that even though the leading article may close the circuit at the point 45, the motor will not be energized to restore the switch to inoperative position so long as any article exerts pressure against the feeler 52 or is in contact with either of the circuit breaker levers 66 or 72. Thus a long series of articles, closely following one another, may be delivered to the same station by a single actuation of a key at the despatcher station, it being noted that so long as the distance between successive articles does not exceed the distance between the arm 46 and the feeler 52, all such articles will be diverted into the same station. The despatcher may readily note whether articles passing along the belt are in such spaced relationship as to cause them all to enter the same station, and if articles of a given series destined for the same station should be spaced abnormally, it is simply necessary for him to depress the same key again, or as many times as may be necessary to insure the delivery of each article of the series to the proper station.

While but a single complete circuit has been described, it is to be understood that each station is furnished with a similar electrical circuit so that articles may be diverted in any desired order to the proper stations.

Figure 5:
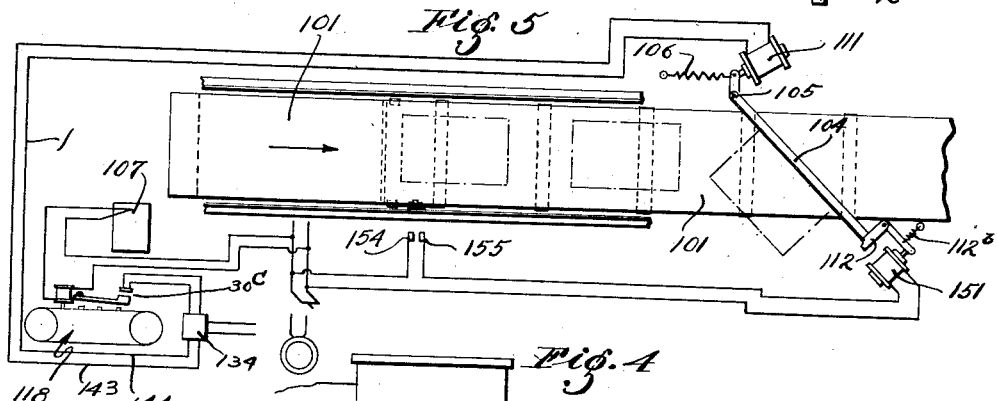
Fig. 5 is a diagrammatic plan view illustrating a modification of the structure shown in Fig. 1.

In Figs. 5 and 6 I have illustrated a modified construction which may be desirable under some circumstances. In these figures but a single switch is illustrated. The conveyer comprises a belt 101, and the station comprises a switch arm 104 pivoted at 105 and normally held in inoperative position parallel to the conveyer track by a spring 106. The keyboard 107 at the despatcher station as well as the timing controller 118 may be similar to the keyboard and controller above described. The motor for actuating the switch is here shown as a magnet or solenoid 111 connected by conductors 143 and 144 to a controlling box 134 such as above described, and which operates to energize the motor 111 whenever the circuit is completed at 30ᶜ by an elevated index pin. In this arrangement the latch 112 is normally held in inoperative position by means of a spring 112ᵇ, but may be moved to operative position by a magnet 151. This magnet is connected to a source of current by conductors 152, 153, a circuit closer comprising terminals 154 and 155 (Fig. 6) being included in the circuit.

In this arrangement a portion of the belt 101 immediately preceding the position of the switch 104 is supported by anti-friction rollers 157 mounted upon lever arms fulcrumed upon knife-edge supports 158, the lever devices being provided with counter weights 159 which, when the conveyer belt is empty, are adapted to lift that portion of the belt which is supported by the rollers 157, slightly above the normal plane of the belt. The lever devices which support the belt are all connected to a rod 160, one end of which is adjacent to the contact 155. Whenever an article rests upon elevated portion of the belt 101, the weight of the articles tends to depress such part of the belt, thus swinging the supporting levers and moving the rod 160 lengthwise so as to close the circuit between the terminals 154 and 155. Thus when the motor 111 has been energized to swing the switch 104 to its operative position, it is retained in this position by the latch 112 so long as an article rests upon the elevated portion of the belt, and thus, if a series of articles be destined for the same station, the switch remains in its operative position until the last of such articles has been delivered from the elevated part of the belt, whereupon such portion of the belt raises, the circuit is broken through the magnet 151, the latch is released, and the spring 106 is free to restore the switch to its normal position, provided the motor magnet 111 has been deenergized.

In Fig. 9 I have illustrated a modified form of index element carrier consisting of a circular drum 180 having a series of sockets 181 in its periphery, such sockets being adapted to hold index pins 182 corresponding to the pins 22, above described. When the number of stations is relatively small or when it is not necessary so frequently to change the destination of articles moving on the conveyer, this rigid type of carrier may be preferred, although the belt type is of more general utility and capable of application to almost all situations.

While I have above referred to pins as the movable index elements, I contemplate that other forms of index elements may be used in the timing controller carrier, and that in place of the keyboard, such pins may be adjusted manually or otherwise as may be preferred. I also contemplate that mechanism other than electrical connections and actuating devices may be found useful under certain circumstances, and while I have here specifically illustrated a conveyer belt as means for moving the articles, I contemplate that other means may be employed and that the term "conveyer" as here used is broadly applicable to any system in which articles move along a predetermined path, track, or way under any form of power or moving means, and whether such articles themselves constitute the object to be delivered, or whether they merely form containers for the material which is to be sent to the various stations.

I claim:

1. Apparatus of the class described comprising a conveyer, a normally inoperative switch device for diverting articles from the conveyer, a timing controller adapted to move said switch device to an operative position after a predetermined delay, means tending to retain the switch in operative position, release means actuable by an article diverted from the conveyer by said switch for restoring the switch to inoperative position, and means to prevent operation of said release means so long as any article is within range of operation of the switch.

2. Apparatus of the class described comprising a conveyer, a series of load removers for discharging articles from the conveyer at selected points, a timing controller adapted to make any selected load remover operative after a predetermined delay and to maintain it in operative condition, release means actuable by an article removed from the conveyer by said load remover to render said load remover inoperative, and means to prevent operation of said release means so long as any article is within the range of operation of said load remover.

3. Apparatus of the class described comprising a conveyer, means for unloading articles from the conveyer, said unloading means comprising motive means for starting and stopping the operation of the unloading means, a timing controller for starting said motive means into operation after a predetermined delay whereby to initiate operation of the unloading means, and means actuable by an article unloaded from the conveyer by the unloading means for causing the motive means to stop the operation of the unloading means.

4. Apparatus of the class described comprising a conveyer, means for unloading articles from the conveyer, said unloading means comprising a motor for starting the operation of the unloading means, a timing controller for starting said motor into operation after a predetermined delay whereby to initiate operation of the unloading means, means tending to keep the unloading means in operation, said motor being actuable by an article unloaded from the conveyer to stop the operation of the unloading means.

5. Apparatus of the class described comprising a conveyer, a switch for diverting articles from the conveyer, a motor for moving the switch to and from operative position, a timing controller for starting said motor into operation after a predetermined delay whereby to set the switch in operative position, and means actuated by an article diverted from the conveyer by said switch for causing the motor to return the switch to inoperative position.

6. Apparatus of the class described comprising a conveyer, a switch for diverting articles from the conveyer, means for moving the switch to and from operative position comprising a motor, a timing controller for starting the motor into operation after a predetermined delay whereby to set the switch in operative position, means for stopping the motor when the switch reaches operative position, and means actuable by an article diverted from the conveyer by said switch for again starting the motor and thereby withdrawing the switch from operative position.

7. Apparatus of the class described comprising a conveyer, a switch for diverting articles from the conveyer, electromotive means for moving the switch to and from operative position, a timing controller for closing an energizing circuit for said electromotive means after a predetermined delay whereby to move the switch to operative position, means for breaking said circuit when the switch reaches operative position, and means actuable by an article diverted from the conveyer by said switch for closing an energizing circuit for said electromotive means thereby moving the switch to inoperative position.

8. Apparatus of the class described comprising a conveyer, a switch for diverting articles from the conveyer, electromotive means for moving the switch to and from operative position, a timing controller for closing an energizing circuit for said motor means after a predetermined delay whereby to move the switch to operative position, means for breaking said circuit when the switch reaches operative position, means actuated by an article diverted from the conveyer by said switch for closing an energizing circuit for said electromotive means thereby to move the switch to inoperative position, and means to prevent closing of said last-named circuit so long as an article remains within range of operation of the switch.

9. Apparatus of the class described comprising a conveyer, a switch for diverting articles from the conveyer, electromotive means for moving the switch to and from operative position, a timing controller for closing an energizing circuit for said electromotive means after a predetermined delay whereby to move the switch to operative position, means for breaking said circuit when the switch reaches operative position, means actuated by an article diverted from the conveyer by said switch for closing an energizing circuit for said electromotive means thereby to move the switch to inoperative position, and means actuable by a following article to delay closing of said last-named circuit for a predetermined time after the switch has functioned.

10. Apparatus of the class described comprising a conveyer, a switch for diverting articles from the conveyer, electromotive means for moving the switch to and from operative position, a timing controller for closing an energizing circuit for said electromotive means after a predetermined delay whereby to move the switch to operative position, means for breaking said circuit when the switch reaches operative position, means activated by an article diverted from the conveyer by said switch for closing an energizing circuit for said electromotive means thereby to move the switch to inoperative position, and means to prevent closing of said last-named circuit so long as articles continue to follow one another along the conveyer at less than a predetermined distance apart.

11. Apparatus of the class described comprising a conveyer, a switch for diverting articles from the conveyer, an electric motor, a rotary shaft actuated by the motor, means operated by the shaft in turning through a predetermined angle to set the switch in operative position and in turning through a further angle to return the switch to inoperative position, a timing controller for closing an energizing circuit for said motor, after a predetermined delay, thereby causing said shaft to turn and move the switch to operative position, means actuated by the shaft for breaking the circuit when the switch reaches operative position, and a circuit closer actuable by an article diverted from the conveyer by the switch, for closing an energizing circuit for the motor, thereby causing the shaft to turn and restore the switch to inoperative position.

12. Apparatus of the class described comprising a conveyer, a switch for diverting articles from the conveyer, an electric motor, a rotary shaft actuated by the motor, means operated by the shaft in turning through a predetermined angle to set the switch in operative position and in turning through a further angle to return the switch to inoperative position, a timing controller for closing an energizing circuit for said motor, after a predetermined delay, thereby causing said shaft to turn and move the switch to operative position, a cam actuated by the shaft, said cam breaking the circuit when the switch reaches operative position, means actuated by an article diverted from the conveyer by the switch for closing an energizing circuit for the motor whereby to cause the shaft to turn and move the switch to inoperative position, and means actuated by said cam for breaking the motor circuit when the switch reaches inoperative position.

13. Apparatus of the class described comprising a conveyer, a switch for diverting articles from the conveyer, an electric motor for moving the switch toward and from operative position, a timing controller for closing an energizing circuit for said motor whereby to move the switch to operative position, means for breaking the circuit when the switch reaches operative position, a circuit closer, actuable by an article diverted from the conveyer by the switch, for closing an energizing circuit for the motor, thereby to restore the switch to inoperative position, and circuit breaking means preventing completion of the circuit by said circuit closer so long as an article remains within range of operation of the switch.

14. Apparatus of the class described comprising a conveyer, a switch for diverting articles from the conveyer, an electric motor for moving the switch toward and from operative position, a timing controller for closing an energizing circuit for said motor whereby to move the switch to operative position, means for breaking the circuit when the switch reaches operative position, and a circuit closer, actuable by an article diverted from the conveyer by the switch, for closing an energizing circuit for the motor whereby to restore the switch to inoperative position, and circuit breaking means comprising a feeler carried by the switch and engageable by an article during the switching operation to prevent completion of the circuit by the circuit closer.

15. Apparatus of the class described comprising a conveyer, a switch for diverting articles from the conveyer, electromotive means for moving the switch to and from operative position, a timing controller for closing an energizing circuit for said electromotive means whereby to move the switch to operative position, means for breaking the circuit when the switch reaches operative position, a circuit closer, actuable by an article diverted from the conveyer by the switch, for closing an energizing circuit for the motive means whereby to restore the switch to inoperative position, and circuit breaking means comprising a plurality of feelers engageable successively by an article during its diversion from the conveyer and thereby preventing completion of the circuit by the circuit closer.

16. Apparatus of the class described comprising a conveyer, a switch for diverting articles from the conveyer, electromotive means for moving the switch toward and from operative position, a timing controller for closing an energizing circuit for said motor whereby to move the switch to operative position, means for breaking the circuit when the switch reaches operative position, a circuit closer, actuable by an article diverted from the conveyer by the switch, for closing an energizing circuit for the motor whereby to restore the switch to inoperative position, and circuit breaking means comprising a plurality of feeler devices engageable successively by an article during and after the switching operation and thereby preventing completion of the circuit by the circuit closer during and for a predetermined time after the completion of the operation.

17. Apparatus of the class described comprising a conveyer, a switch for diverting articles from the conveyer, electromotive means for moving the switch toward and from operative position, a timing controller for closing an energizing circuit for said motor thereby moving the switch to operative position, means for breaking the circuit when the switch reaches operative position, means, actuable by an article diverted from the conveyer by the switch, for closing an energizing circuit for the motor whereby to restore the switch to inoperative position, and circuit breaking means, engageable by articles while being diverted from the conveyer, so constructed and arranged as to prevent closure of the circuit of the circuit closer so long as articles continue to approach along the conveyer at less than a predetermined distance apart.

18. Apparatus of the class described having a conveyer provided with unloading means and a timing controller for the unloading means, said controller comprising an endless carrier provided with a movable pin, means for moving said pin to an operative position such that it projects from the carrier, means for moving the carrier, means actuable by the projecting pin when the latter reaches a predetermined point in its travel with the carrier for initiating operation of the unloading means, and means for restoring said pin to inoperative position on the carrier.

19. Apparatus of the class described having a conveyer provided with unloading means and a timing controller for the unloading means, said controller comprising a carrier provided with a socket for the reception of a movable pin, a pin normally disposed in an inoperative position in the socket, means for moving the pin to an operative position such that it projects from its socket, means for moving the carrier, means actuable by the projecting pin when the latter reaches a predetermined point in its travel with the carrier for initiating operation of the unloading means, and means for retracting the pin to inoperative position in its socket.

20. Apparatus of the class described having a conveyer provided with unloading means and a timing controller for the unloading means, said controller comprising an endless chain provided with a longitudinally extending series of index elements each movable from an inoperative to operative position, means disposed at a predetermined point relatively to the path of the chain for moving any selected index element to operative position, means disposed at another point, spaced from the first, and engageable by an operatively positioned index element to initiate operation of the unloading device, and means disposed at another point for restoring the index element to inoperative position.

21. Apparatus of the class described having a conveyer provided with unloading means and a timing controller for the unloading means, said controller comprising an endless chain provided with a plurality of longitudinally extended series of index elements, each series corresponding to one of the unloading devices, said index elements being movable from inoperative to operative position, means for moving the chain at a predetermined linear speed, means disposed at a predetermined point relatively to the movement of the chain for moving any selected index element from inoperative to operative position, means, disposed at another point spaced from the first in the direction of advance of the chain, actuable by an operatively positioned index element, for initiating operation of that unloading device which corresponds to the series of index elements to which said operatively positioned element belongs, and means at another point in the travel of the carrier for restoring operatively positioned index elements to inoperative position.

22. Apparatus of the class described having a conveyer provided with unloading means and a timing controller for the unloading means, said controller comprising an endless carrier provided with movable index element normally disposed in inoperative position on the carrier, means for moving the carrier in definite timed relation to the speed of travel of articles along the conveyer, magnetic means for moving the index element on the carrier from inoperative to operative position, means actuable by an operatively positioned index element, when the latter reaches a predetermined point in its travel with the carrier, for initiating operation of the unloading means, and means for resetting the index element in inoperative position.

23. Apparatus of the class described having a conveyer provided with unloading means and a timing controller for the unloading means, said controller comprising an endless carrier provided with a socket for the reception of a movable pin, means to retain a pin in either of two selected positions in the socket in one of which the end of the pin projects beyond the socket, means for moving the pin to such projecting position, means for moving the carrier in timed relation to an article traveling along the conveyer, means actuable by a projecting pin when the latter reaches a predetermined point in its travel with the carrier for initiating operation of the unloading means, and means for restoring the pin to the other of said two positions.

24. Apparatus of the class described having a conveyer provided with a plurality of unloading devices and a timing controller for the unloading means, said controller comprising an endless carrier provided with a movable index element corresponding to each unloading device, means for moving the carrier in definite timed relation to the rate of movement of an article along the conveyer, means for selectively moving any of said index elements to operative position on the carrier, means actuable by an operatively positioned index element, as the latter reaches a predetermined point in its travel with the carrier, to set the corresponding unloading means into operation, and means operative at another point in the path of travel of the carrier for restoring all such index elements to an inoperative position on the carrier.

25. Apparatus of the class described having a conveyer provided with a plurality of unloading devices and a timing controller for the unloading means, said controller comprising an endless carrier provided with a series of spaced index elements corresponding to each unloading device, means for moving any selected index element of any series from an inoperative to an operative position, means for moving the carrier, and means engageable by an operatively positioned index element of any series, when said element reaches a predetermined point in the path of travel of the carrier, to initiate operation of the unloading means corresponding to said series.

26. Apparatus of the class described having a conveyer provided with a plurality of unloading devices and a timing controller, said controller comprising a carrier having an endless peripheral surface, means for moving the carrier so that the linear speed of its peripheral surface bears a definite ratio to the speed of an article moving along the conveyer, said carrier being provided with series of spaced sockets, the series being spaced transversely of the peripheral surface of the carrier, each series corresponding to one of the unloading devices, a pin disposed in each socket, means for selectively moving any pin from an inoperative to an operative position in its socket, and means actuable by an operatively positioned pin, as such pin reaches a predetermined point in its travel with the carrier, to initiate operation of the unloading device corresponding to the series of sockets to which the operatively positioned pin belongs.

27. Apparatus of the class described having a conveyer provided with a plurality of unloading devices and a timing controller, said controller comprising an endless chain comprising a series of transverse bars, each bar carrying a plurality of movable index elements, the index elements of adjacent bars being disposed in alignment so as to form series extending longitudinally of the chain, each series corresponding to one of the unloading devices, and means for moving any selected index device of any of said series from inoperative to operative position.

28. Apparatus of the class described having a conveyer provided with a plurality of unloading devices and a timing controller, said controller comprising an endless chain comprising a series of transverse bars, each bar having a plurality of sockets and a movable pin in each socket, the sockets of adjacent bars being disposed in alignment so as to form series extending longitudinally of the chain, each series corresponding to one of the unloading devices, and means for moving any selected pin of any of the series from a depressed position in its socket to a position in which it projects from its socket.

29. Apparatus of the class described comprising a conveyer, a switch for diverting articles from the conveyer, said switch being normally ineffective and temporarily effective, means including a timing controller for rendering the switch effective after a predetermined delay, means independent of the timing controller for restoring the switch to its normal ineffective condition, and means actuated by a series of articles for rendering ineffective the operation of the switch restoring means.

30. Apparatus of the class described comprising a conveyer, a switch for diverting articles from the conveyer, said switch being normally ineffective and temporarily effective, means including a timing controller for rendering the switch effective after a predetermined delay, means actuable by each article diverted from the conveyer by the switch for restoring the switch to its normal ineffective condition and movable means actuated by the articles on the conveyer for rendering ineffective the operation of the switch restoring means so long as the articles follow one another along the conveyer at less than a predetermined distance apart.

Signed by me at Syracuse, New York, this twenty-eighth day of March, 1929.

OTTO M. GLAHN.